May 20, 1924.  
P. T. POTTS  
MACHINE FOR MAKING REENFORCED SANITARY CUPS  
Original Filed Jan. 17, 1921   11 Sheets-Sheet 1
1,495,040
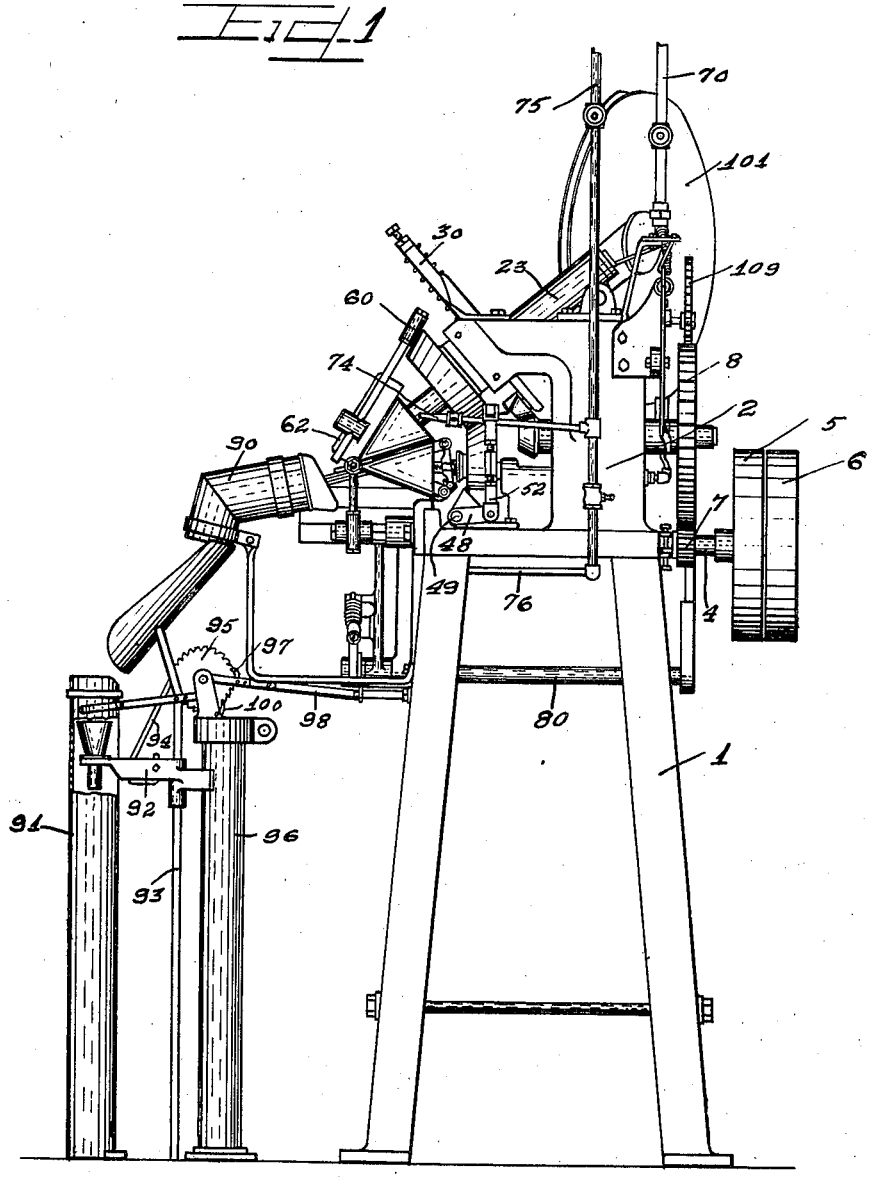

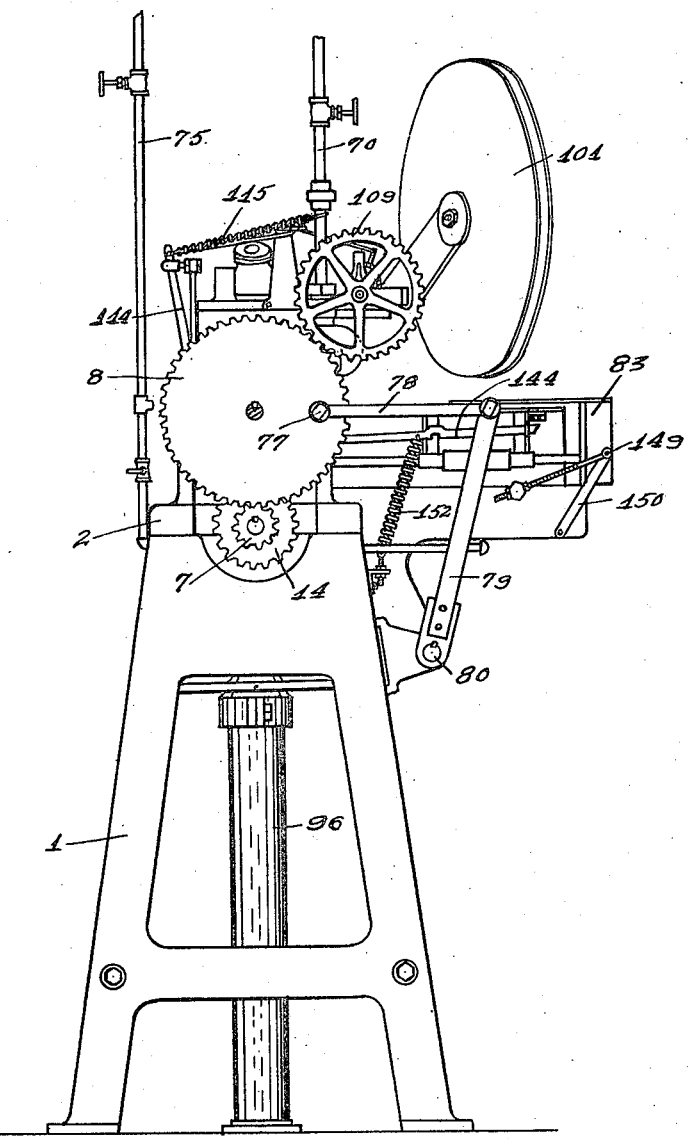

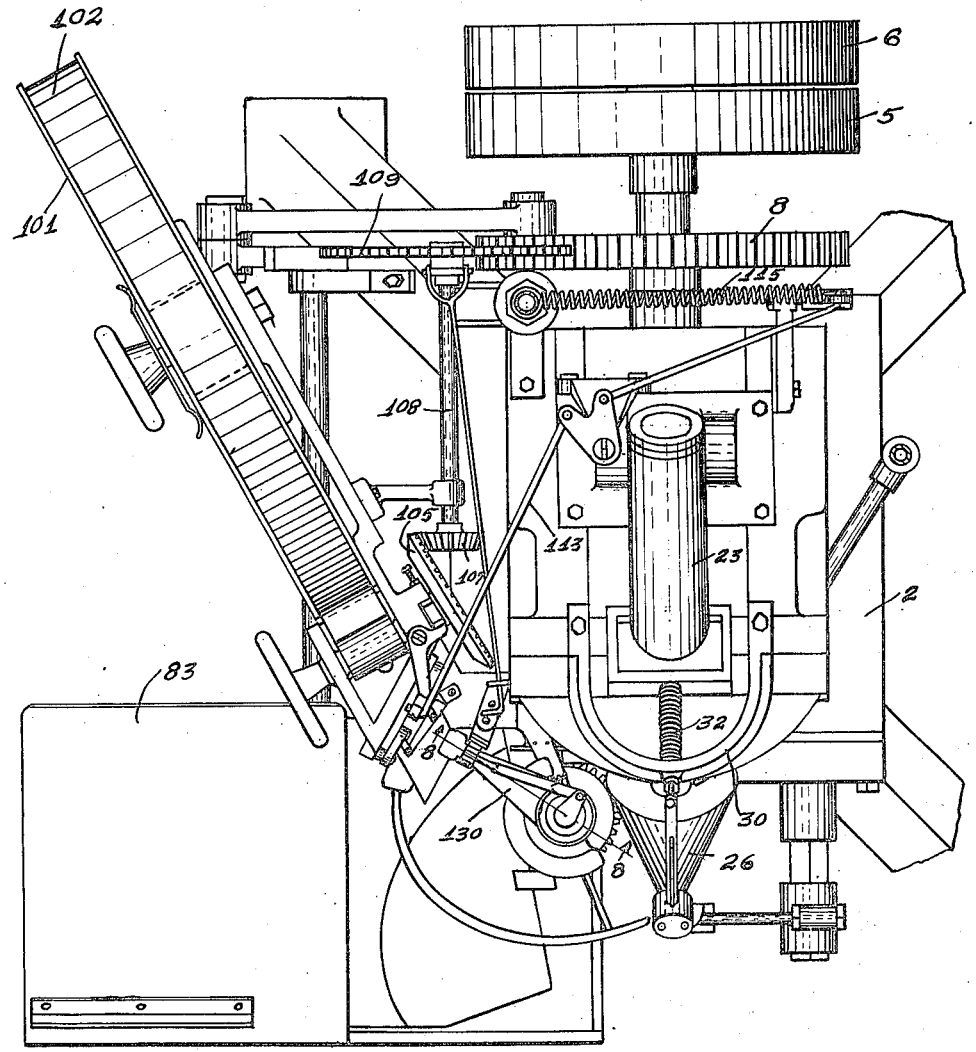

May 20, 1924.
P. T. POTTS
1,495,040
MACHINE FOR MAKING REENFORCED SANITARY CUPS
Original Filed Jan. 17, 1921 11 Sheets-Sheet 4
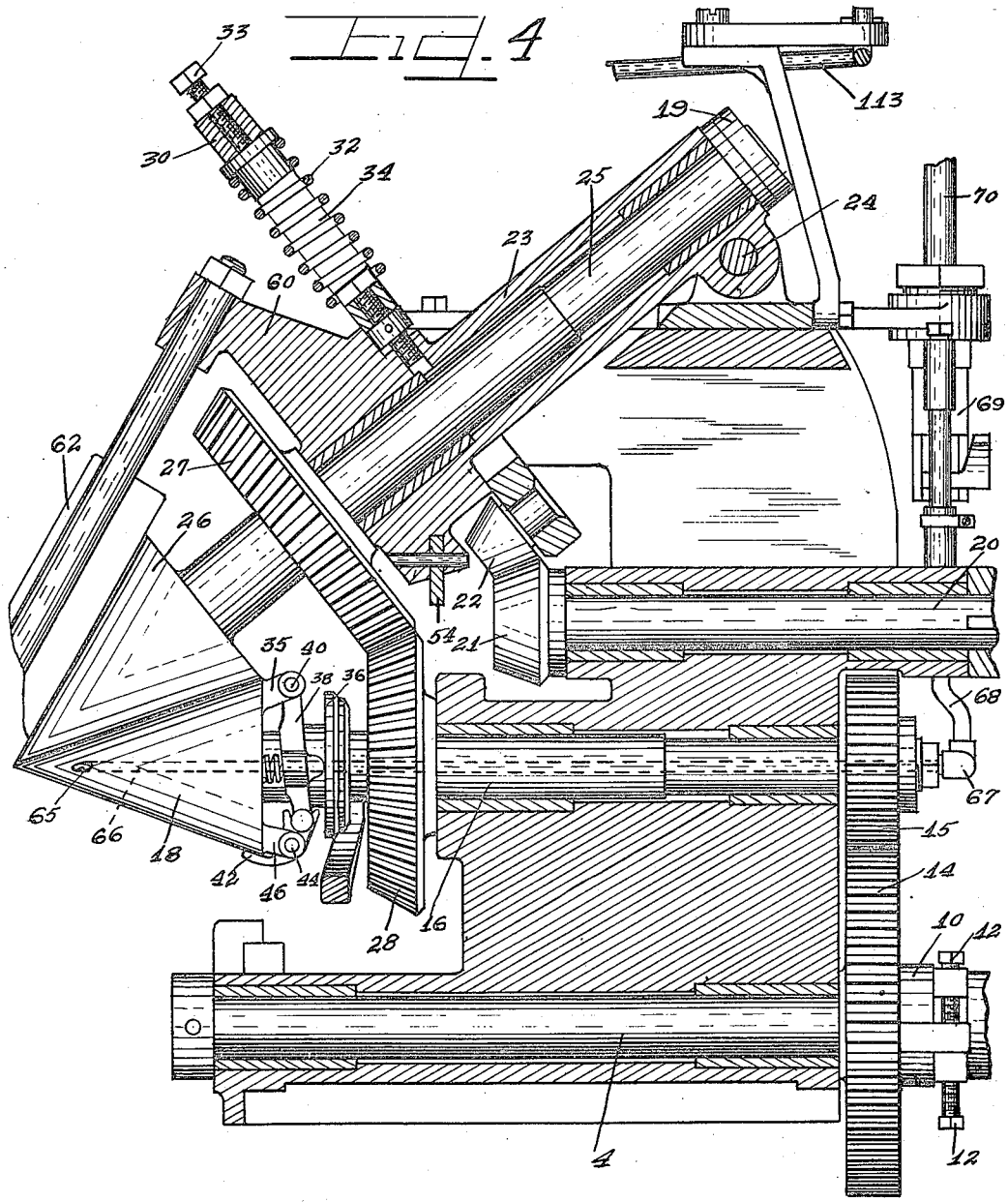

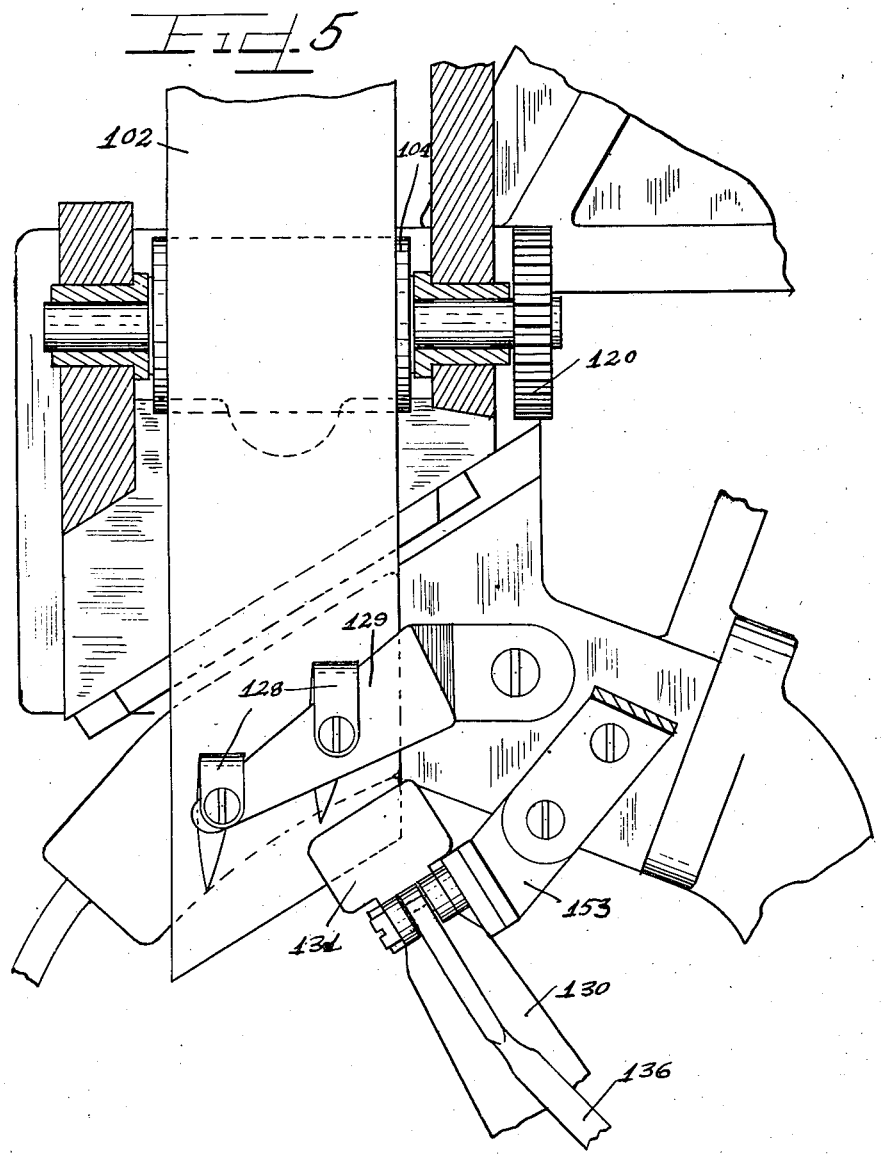

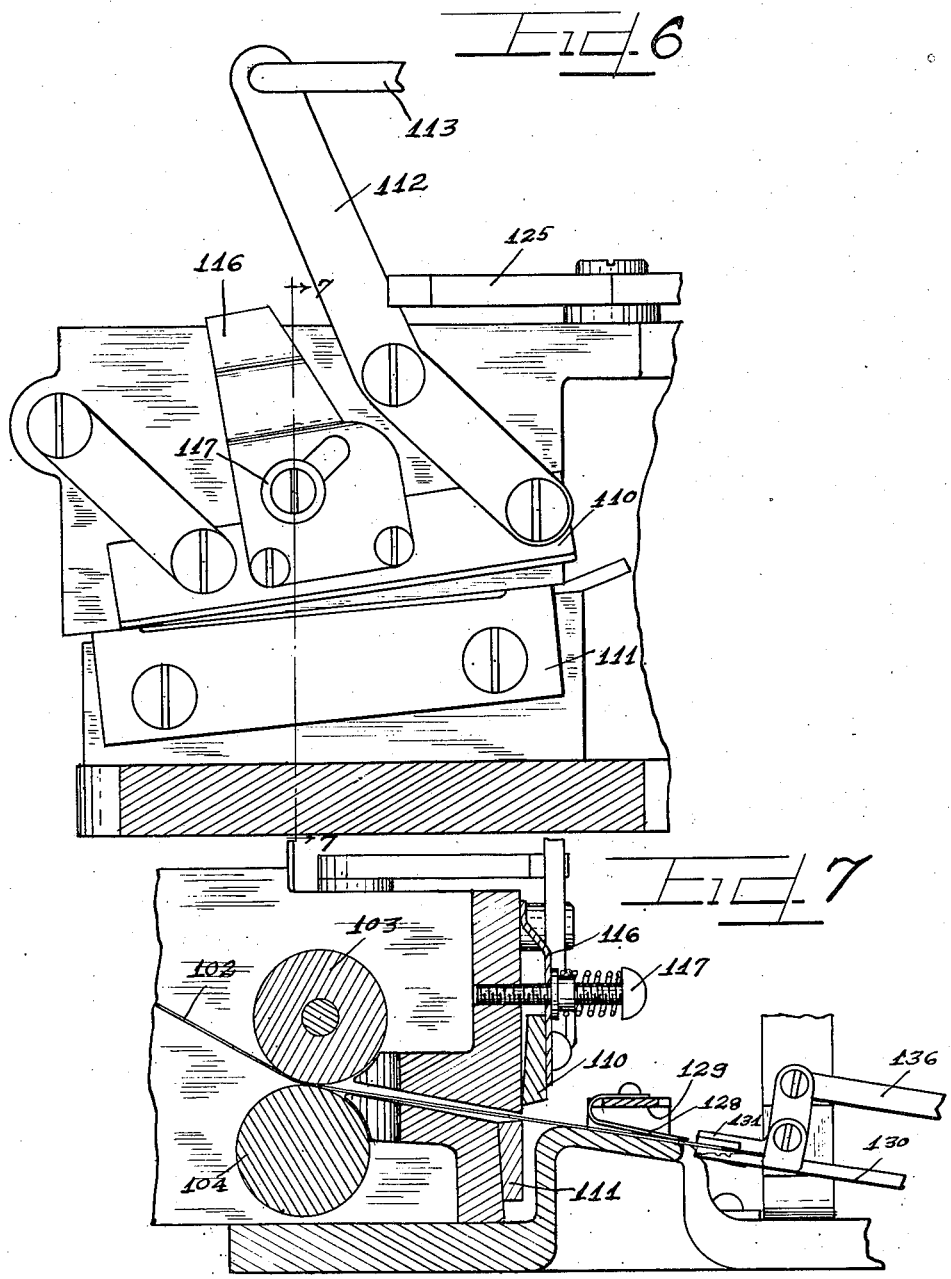

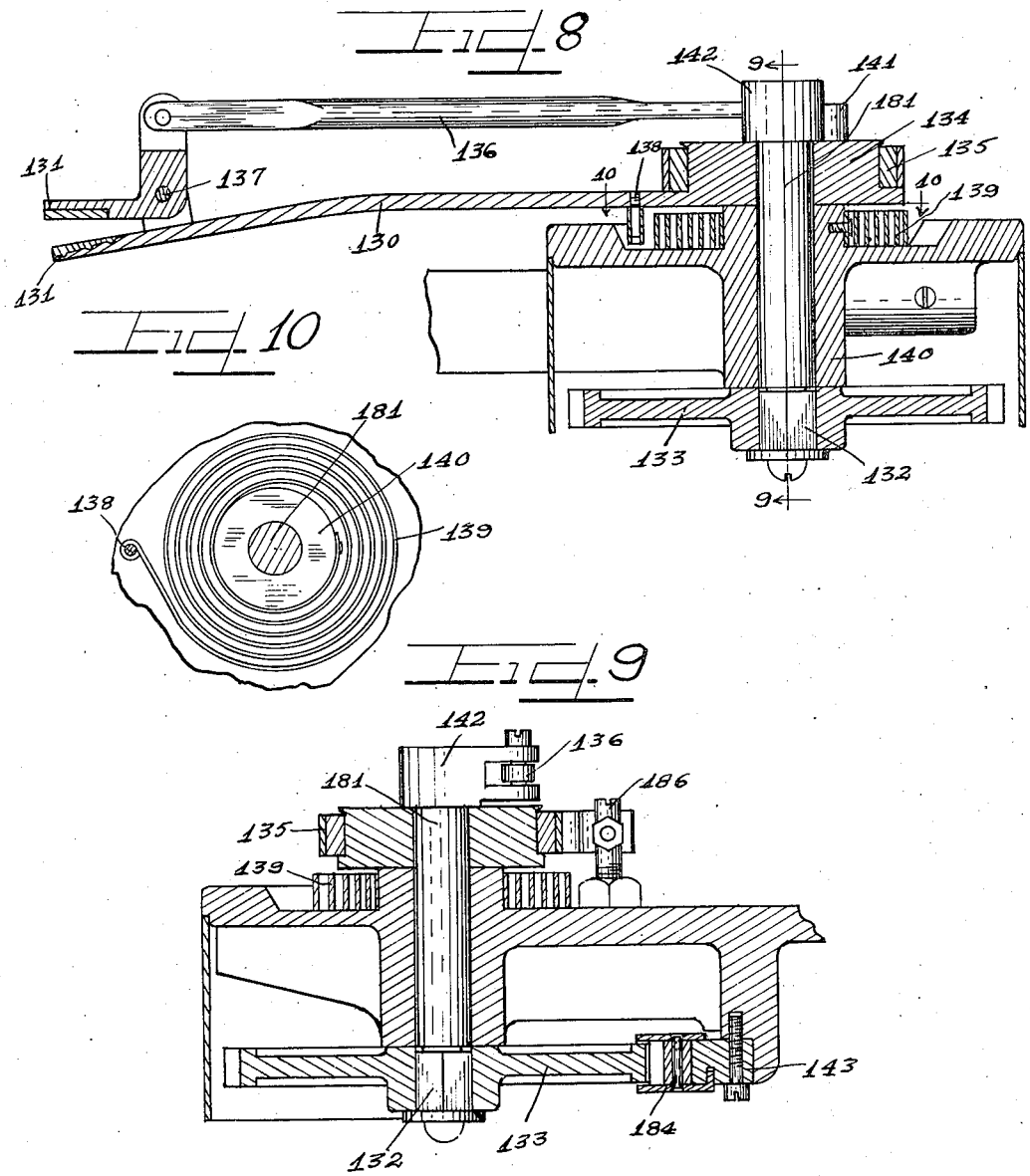

May 20, 1924.
P. T. POTTS
1,495,040
MACHINE FOR MAKING REENFORCED SANITARY CUPS
Original Filed Jan. 17, 1921   11 Sheets—Sheet 8
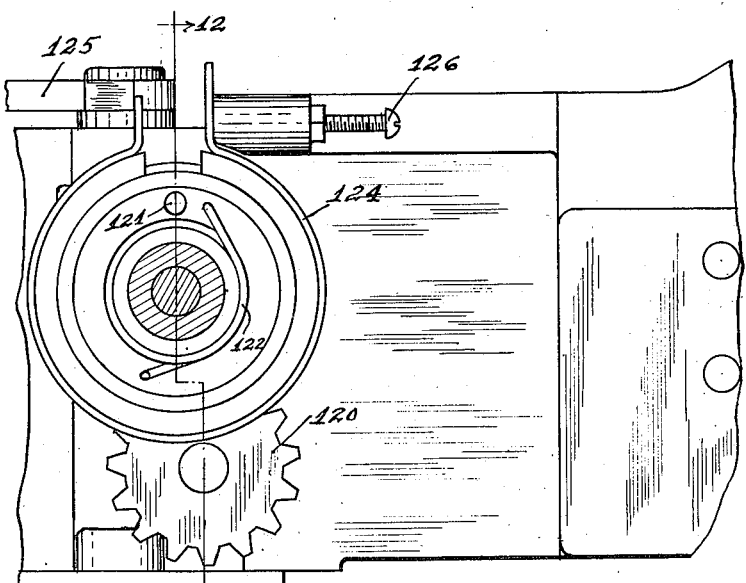
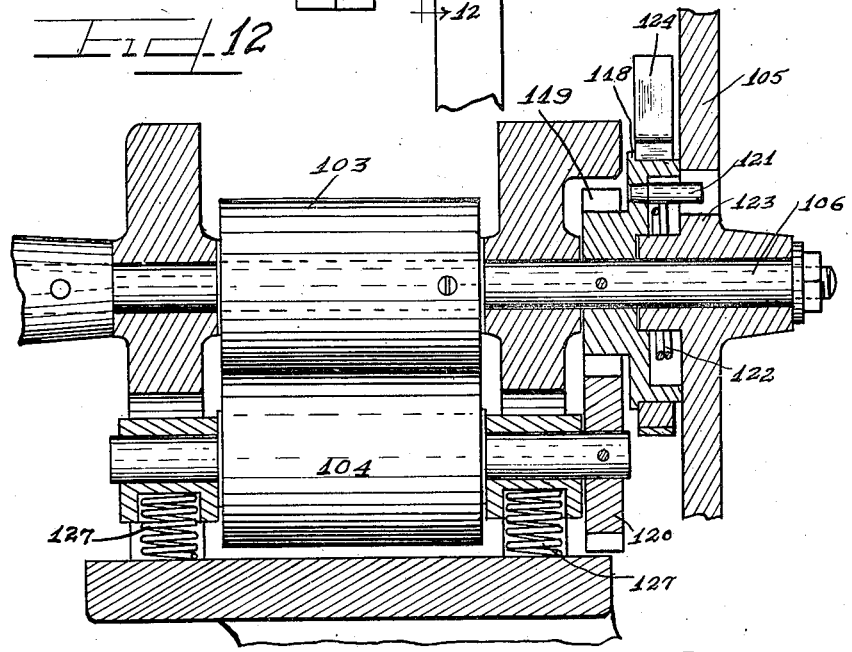

May 20, 1924.
P. T. POTTS
MACHINE FOR MAKING REENFORCED SANITARY CUPS
Original Filed Jan. 17. 1921  11 Sheets-Sheet 9
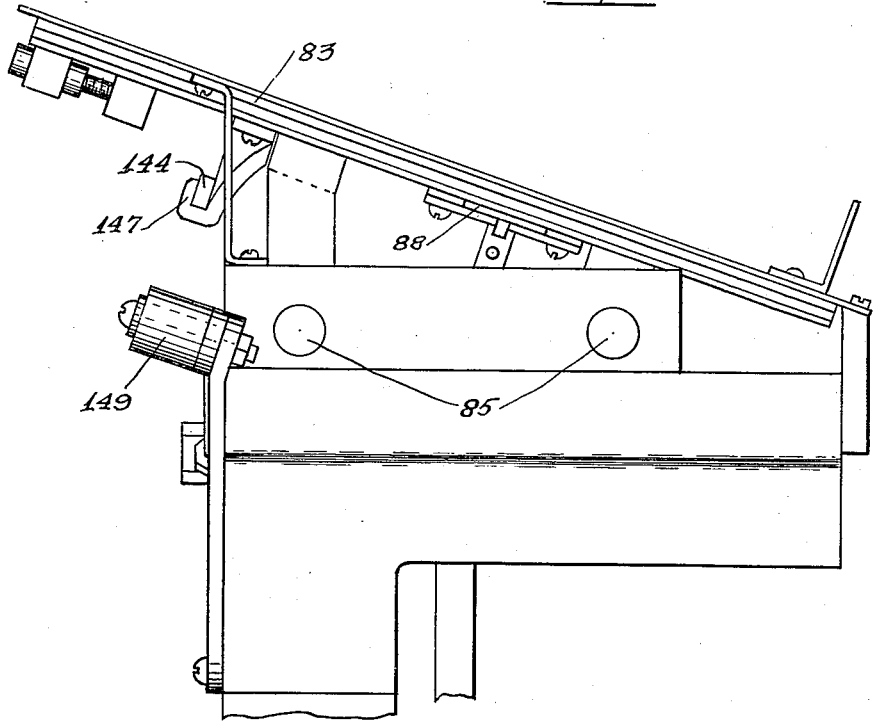
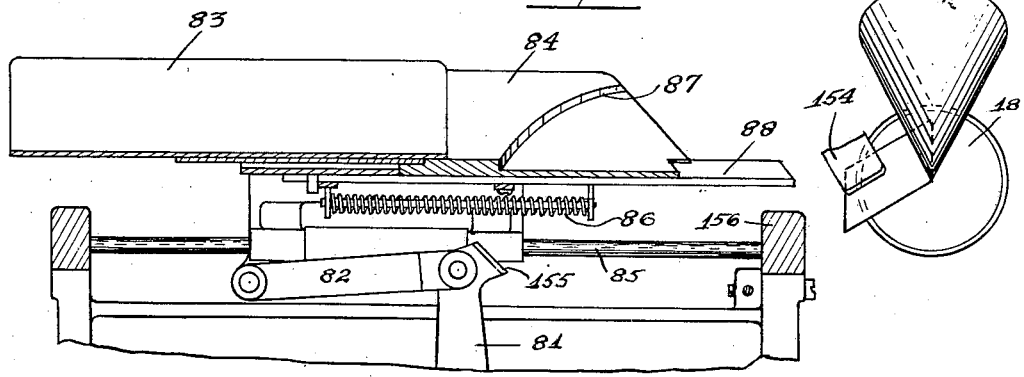

May 20, 1924.
P. T. POTTS
1,495,040
MACHINE FOR MAKING REENFORCED SANITARY CUPS
Original Filed Jan. 17, 1921  11 Sheets-Sheet 10
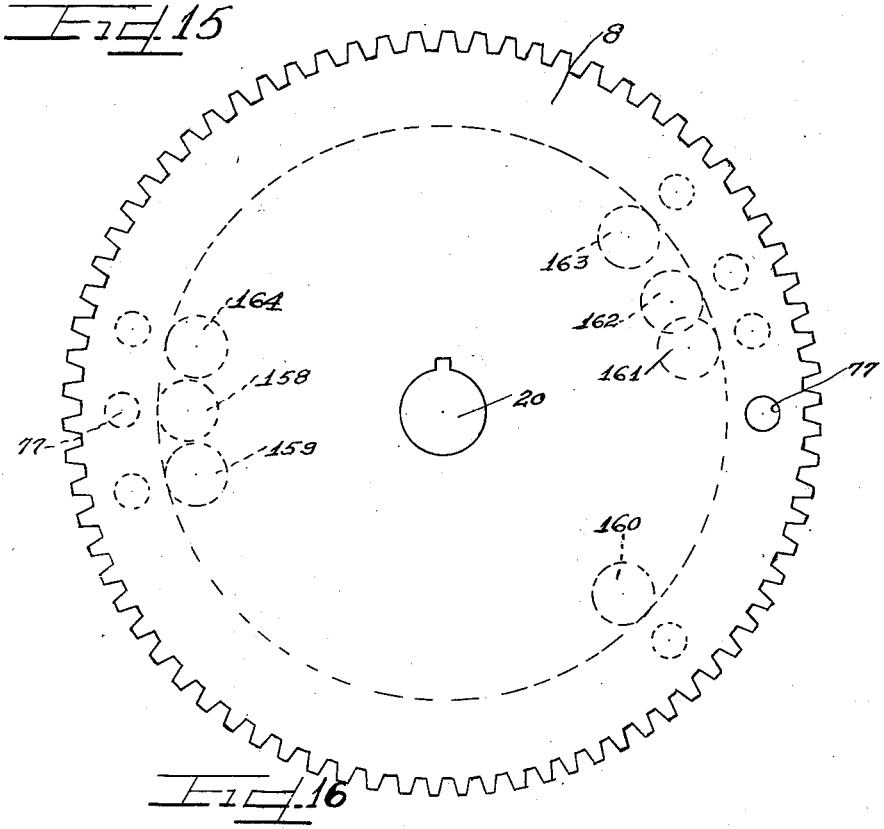
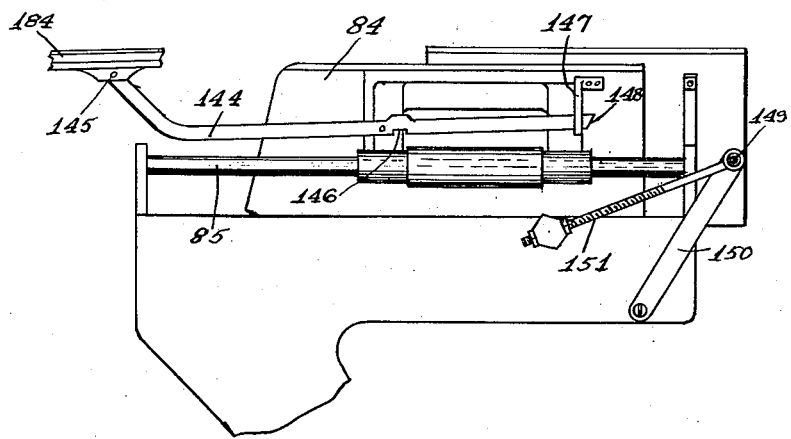

May 20, 1924. 1,495,040
P. T. POTTS
MACHINE FOR MAKING REENFORCED SANITARY CUPS
Original Filed Jan. 17, 1921 11 Sheets-Sheet 11
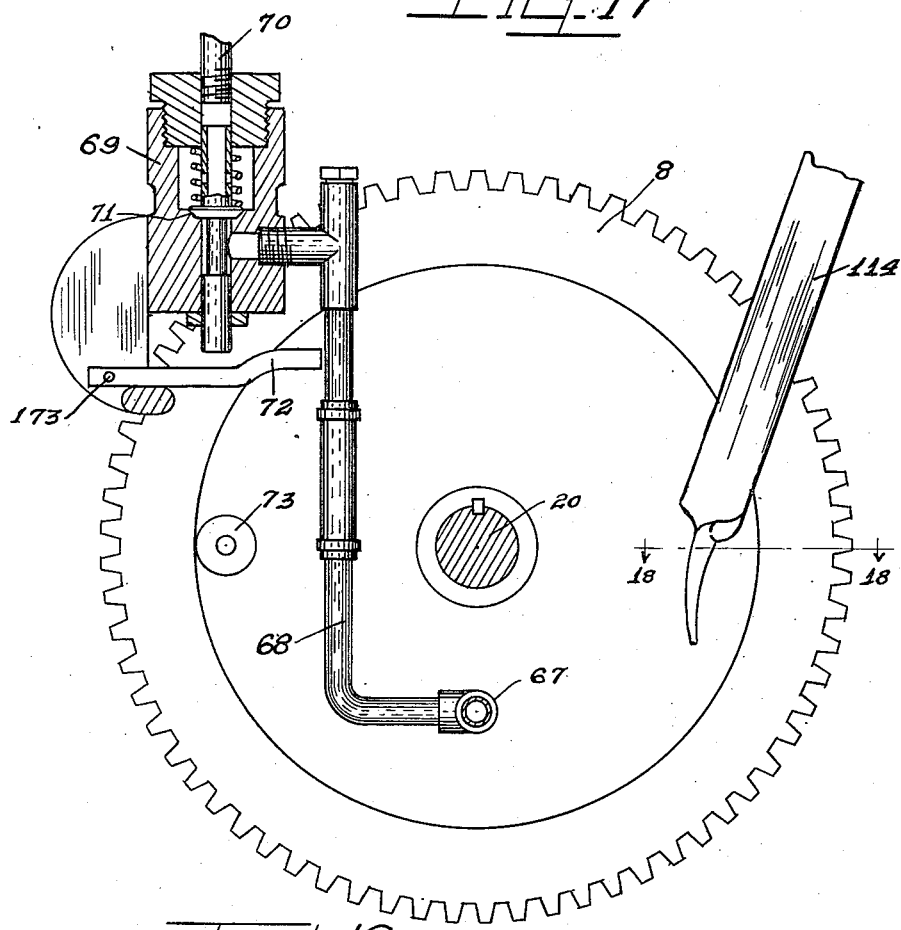
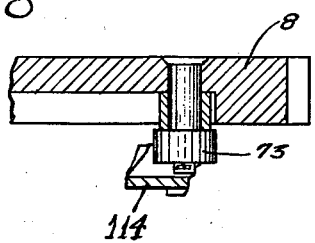
Witnesses
Rudolph T. Berg
Charles Hill, Jr.
Inventor
PETER T. POTTS.
By Charles W. Hill Atty.

Patented May 20, 1924.

1,495,040

UNITED STATES PATENT OFFICE.

PETER T. POTTS, OF CHICAGO, ILLINOIS, ASSIGNOR TO THE VORTEX MFG. CO., A CORPORATION OF ILLINOIS.

MACHINE FOR MAKING REENFORCED SANITARY CUPS.

Application filed January 17, 1921, Serial No. 437,833. Renewed November 23, 1922.

*To all whom it may concern:*

Be it known that I, PETER T. POTTS, a citizen of the United States, and a resident of the city of Chicago, in the county of Cook and State of Illinois, have invented certain new and useful Improvements in Machines for Making Reenforced Sanitary Cups; and I do hereby declare that the following is a full, clear, and exact description of the same, reference being had to the accompanying drawings and to the numerals of reference marked thereon, which form a part of this specification.

This invention relates to machines for making sanitary paper cups having a reenforced tip thereon and is particularly directed to an apparatus for forming conical cups substantially as shown and described in U. S. Letters Patent No. 1,188,048 and 1,260,520, both patented by David F. Curtin, of Chicago, Illinois.

The chief object of this invention is to provide means for feeding blanks of the proper shape into position between dies together with reinforcing tips for the completed cups; forming said blanks and tips into cups and discharging them from the dies or formers when completed into a container which automatically stacks them into lots for shipping.

Another object of this invention is the provision of means whereby a fluid-tight, complete and neat appearing cup is readily made from a prepared blank of paraffin covered paper or the like, this cup being provided with a reinforcing or strengthening tip.

A further object of this invention is the provision of means whereby each cup when formed will be symmetrical and a perfectly finished article, having the reinforcing tip securely held in proper position thereon.

It is also an object of the invention to provide a cup forming machine, wherein a means is provided for automatically cutting reinforcing blanks from a strip of material, which reinforcing blanks are automatically gripped and removed from a holding mechanism and delivered to cup-forming devices forming a part of the machine.

It is furthermore an object of the invention to provide a cup forming machine having a feeding means for delivering blanks to cup formers, said feeding means also acting to actuate a means for delivering cup reinforcing tips from a tip forming mechanism to the cup formers whereby reenforced cups are adapted to be formed and automatically discharged into a cup stacking device operated from the machine.

Another important object of this invention is the provision of a machine which automatically forms the reinforcing tips for reenforced conical paper cups, and in which the tips are automatically fed from the forming means to the cup making dies at predetermined intervals.

Other and further important objects of this invention will be apparent from the disclosures in the drawings and annexed specification.

The invention (in a preferred form) is illustrated in the drawings and hereinafter more fully described.

In the drawings:

Figure 1 is a side view of a machine embodying the preferred form of the invention.

Figure 2 is a rear view of the same.

Figure 3 is a top plan view of the machine showing the reinforcing tip making and feeding mechanism in position.

Figure 4 is an enlarged sectional view showing the construction and operation of the cup forming dies.

Figure 5 is an enlarged detail view showing the cutter and a portion of the feeding arm for the reinforcing tips.

Figure 6 is a front elevation of the knives which cut the reinforcing tips into proper shape.

Figure 7 is a section taken on the line 7—7 of Figure 6 and which also shows a portion of the tip feeding arm.

Figure 8 is a section taken on the line 8—8 of Figure 3.

Figure 9 is a section taken on the line 9—9 of Figure 8.

Figure 10 is a section taken on the line 10—10 of Figure 8, looking in the direction indicated by the arrows.

Figure 11 is a side elevation of a portion of the device for feeding the strips of paper to the cutter for forming the reinforcing tips, the bevelled driving gear being removed.

Figure 12 is a section taken substantially on the line 12—12 of Figure 11, showing the driving gear in position.

Figure 13 is an end elevation of the blank feeding table.

Figure 14 is a partial sectional view of the table showing the cup forming dies and their relation thereto.

Figure 15 is a plan view of the main driving gear showing in dotted lines the several actuating positions of the operating roller carried thereby.

Figure 16 is a rear view of the feed table showing the feed arm actuating mechanism.

Figure 17 is a plan view of the main driving gear showing certain operating devices in conjunction therewith.

Figure 18 is a sectional view taken substantially on the line 18—18 of Figure 17, the operating roller being shown in a different position.

As shown on the drawings:

The reference numeral 1 indicates the main frame of the machine upon which the head 2 is supported. Mounted in suitable bearings in the head 2 is a driving shaft 4 upon the end of which is mounted a fast and a loose pulley 5 and 6. respectively, adapted to be driven by a belt in an ordinary manner. A driving gear 7 is keyed to the shaft 4 and this gear meshes with a main operating gear 8. Adjustably mounted upon the driving shaft 4 by means of a sleeve 10 (Figure 4) and locking bolts 12 is another driving gear 14 in mesh with a smaller gear 15 which is mounted upon a driving shaft 16 positioned above the shaft 4 and parallel thereto. This shaft 16 has fixed at its outer end the main cup forming cone or die 18. The main driving gear 8 is mounted upon a shaft 20 also positioned in the head 2 of the machine and immediately above and parallel to the shafts 4 and 16. Mounted upon the end of the shaft 20 is a beveled cam roller 21 adapted to co-act with another beveled roller 22 mounted on the under side of a sleeve member 23 which is pivoted to the machine head at 24. The member 23 constitutes a cylindrical bearing for a shaft 25 having fixed at its outer end another cup forming die 26 adapted to co-operate with the die 18. The cam 21 has a raised portion which co-operates with the roller 22 to raise the free end of the bearing member 23 and so separate the cup forming dies at predetermined intervals. The shaft 25 is held in position in the bearing 23 by any suitable means such as washers 19 on the upper end thereof. Fixed upon the shaft 25 immediately behind the conical die 26 is a bevelled gear 27 adapted to co-operate with a similar gear 28 mounted on the shaft 16. The gears 27 and 28 are provided with extra long teeth which permit of their driving relation even when they are slightly separated by the action of the cam 21 and roller 22 to allow the ejection of a completed cup from between the forming cones 18 and 26. A yoke 30 is provided on the head 2 and has co-operating therewith a helical spring 32 mounted on a shaft 34 which is adapted to resiliently hold the cup forming cone 26 in contact with its relatively fixed companion cone 18 when in a normal position. A nut 33 is provided in order to adjust the tension of the spring 32.

Slidably mounted upon the shaft 16 is a collar 36 adapted to co-operate with a yoke 38 pivotally mounted at 40 to an extension 35 on the cup forming cone 18. The free end of this yoke is adapted to co-operate with a gripper finger 42 which is pivoted at 44 to an extension 46 on the cup forming cone. Mounted upon the end of a bell crank lever 48 (see Fig. 1) is a means consisting principally of rollers (not shown) which periodically co-operate with the collar 36 to force the same towards the die thereby releasing the gripper finger 42 whenever the dies are separated. The bell-crank lever 48 is pivoted at 49 to the head 2 and has its free end connected to an adjustable lever 52 which in turn is connected at its end to a bar 54 which extends transversely across the machine and has its middle portion pivotally connected to the movable member 23. The further end of the bar 54 is suitably attached to the fixed head 2 so that when the member 23 is raised by means of the action of the cam 21 the gripper finger 42 is released from the cup forming die 18 by means of the action of the bell-crank lever 48 and the yoke 38.

Mounted upon the movable member 23 is a projection 60 having fixed thereon a scraping knife 62 which is provided for the purpose of keeping the auxiliary cup forming die 26 free from any foreign material such as excess paraffin or the like.

Extending longitudinally through the shaft 16 and its cup forming cone 18 and terminating in one or more apertures 65 at the tip of the cup forming cone is a passage 66, shown in dotted lines in Figure 4, which is adapted to allow air or other fluid medium to be pumped therethrough at certain predetermined times in order to blow the completed cup from the die. The rear end of this passage is connected by a flexible connection 67 to a tube 68 connected to a supply valve 69 leading from any convenient source of compressed air by pipe 70. As best seen in Figure 17, a spring-held valve 71 is provided and has a downwardly extending stem adapted to co-operate with a lifting member 72 pivoted at 173 to the head of the machine. Mounted upon the gear wheel 8 and adapted to co-operate with the valve lifting lever 72 is a roller 73. A gas pipe 75 (Fig. 1) leads into the machine and is provided with a jet 74 adapted to allow a flame to play upon the upper cone to heat the same sufficiently to slightly melt the paraffin of the blank, and this pipe 75 also has an extension 76 which extends beneath the frame to the table and is also provided with a jet to allow a flame to play upon the blank feeding member sufficiently to melt the paraffin which also acts to make the blanks adhere at their line of juncture when completed.

Pivotally mounted at 77 upon the gear wheel 8 is a connecting rod 78 (Fig. 2) the other end of which is connected to a form of bell-crank lever 79, 81, pivoted at 80 to the frame 1 of the machine. As shown in Figure 14, the other arm 81 of the bell-crank lever 79, 81, is connected at its top to a link 82 by means of which the movable parts of the table 83 are reciprocated. The table 83 is fixed to the frame 1 by means of suitable brackets and is provided with a movable plate 84 having a depression 87 therein corresponding to the shape of a blank. This plate 84 is slidably mounted upon two longitudinally extending rods 85 upon which it is reciprocated by means of the action of the arm 81 of the bell-crank lever and the connecting link 82. Slidably positioned beneath the movable member 84 is an auxiliary blank supporting member 88 which extends beyond the end of the movable member 84 and is adapted to support the projecting end of the blank when it is being fed into position between the dies. However, as the forward motion of the slide 84 brings it into such close proximity to the dies that the projecting slidable member 88 would contact with them, this member is provided with a suitable stop means comprising a projection 86ª which abuts against a fixed portion 156 of the supporting bracket and which acts to prevent it from contacting with the dies while the blank is being fed thereto. A coiled spring 86 is positioned beneath the slidable member 88 and is adapted to automatically return the same into its extended position upon the backward motion of the blank feeding member 84. The member 86ª further acts to retain the spring 86 in operating position. The fixed portion of the table 83 is provided with a stand adapted to support a number of blanks in position ready to be set by the operator one at a time into the depression 87 in the movable member 84 by which they are transferred to the conical forming dies.

A chute 90 (Fig. 1) leads to a receiver 91 provided for the finished cups which has a movable cup supporting member 92 in the form of an arm extending laterally thereinto through a vertical slot and slidably mounted upon a vertical rod 93 which is parallel to the receiver 91. The arm 92 is held in position by means of a rope or cable 94 which extends over a pulley mounted on a shaft to which is fixed a ratchet wheel 95, the other end of the rope 94 being attached to a weight preferably adapted to slide in a vertical cylinder 96 also parallel to the rod 93 and the receptacle 91. A pawl 97 is mounted upon a reciprocating arm 98, said arm being connected to the table moving mechanism in such a manner that at each reciprocation of the table the pawl 97 feeds the ratchet wheel 95 forward a distance sufficient to allow the movable member 92 in the receptacle 91 to be depressed sufficiently to allow of the insertion of another cup or cone into said cylinder 91. A retaining pawl 100 is provided which is spring-pressed into engagement with the teeth of the ratchet wheel 95 and retains the member 92 in position against the pull of the weight in the cylinder 96.

The reinforcing tips which are applied to the cups are formed from a strip of paper preferably paraffin coated which is contained upon a roll 101 rotatably attached to the frame of the machine. From the roll 101 the strip of paper 102 is brought down between the feed rollers 103 and 104 (Figures 7 and 12) mounted in a bracket provided therefor. The rollers are driven by a beveled gear 105 rotatably mounted upon a shaft 106 upon which the roller 103 is fixed. The gear 105 is driven by a beveled gear 107 (Fig. 3) mounted upon a shaft 108 which in turn is driven by a gear 109 which meshes with the main driving gear 8. A movable knife blade 110 is provided which co-acts with the cutter 111 positioned diagonally across the path of the tape 102 (see Fig. 5) and this blade 110 operates intermittently to cut from the tape diamond-shaped reinforcing tips for the cups. An actuating lever 112 is provided for the cutting blade 110, said actuating lever being connected by a link 113 through suitable mechanism to a trip lever 114 which is mounted in conjunction with the main gear wheel 8 and the end of which is positioned across the path of the roller 73 by which it is therefore intermittently operated (see Figs. 3 and 17). This trip lever 114 is maintained in normal, retracted position by means of a coiled spring 115 attached to the frame of the machine in any convenient manner. The cutting blade 110 is held in position by means of a spring plate 116 attached to the blade and slidably mounted on the face of the cutter and which can be adjustably tightened by means of a screw 117 acting on a coiled spring.

It will be seen that as the strip 102 is continuously fed forward and as the knives 110, 111 only operate intermittently, that the paper will have a tendency to buckle between the knives and the feed rollers if proper provision is not made for the prevention thereof. To overcome this a lost motion clutch is provided between the beveled gear 105 and its driven shaft 106. The beveled gear 105 is rotatably mounted on the shaft 106 and fixed to the shaft immediately behind the gear 105 is a drum 118 which has integral therewith a gear wheel 119 adapted to drive a corresponding gear wheel 120 on the lower feed roller. A projecting pin 121 is provided upon the drum 118 and connected by one end to said pin is a coiled spring 122 having its other end connected to the beveled gear 105 in any suitable manner. The pin 121 projects into a hole 123 in the bevel gear 105 but said hole is of larger diameter than the diameter of the pin thereby allowing some lost motion between gear 105 and the driving drum 118 which is intermittently taken up by the spring 122. Mounted to co-operate with the drum 118 is a brake member 124 which is also intermittently actuated by means of a lever 125, said lever in turn contacted at its free end to the knife operating lever 112. The tension of the brake member 124 may be adjusted by means of the adjusting screw 126 and the lower feed roller 104 has its bearings resiliently supported on coiled springs 127 which operate to securely grip the paper and also to prevent breakage of the machine if any foreign material happens to be fed between the rollers together with the strip of paper 102. Resilient holding members 128 are provided to hold the diamond-shaped reinforcing tip in position after it has been severed from the main strip of paper 102 and before it is taken by the feed arm to be delivered into position between the forming dies. The resilient members 128 are supported upon an overhanging bracket 129 mounted upon the frame of the machine.

A feed arm 130 provided with automatically operating gripping fingers 131 is mounted on the machine and is adapted to take the separated diamond-shaped reinforcing tip from the cutters and convey it to the forming dies at a certain predetermined time. This arm 130 is pivotally mounted on a bracket extending from the machine and is adapted to rotate about a pin 181 in said bracket. The shaft or pin 181 has its lower end formed square as shown at 132 and on this squared end is mounted a gear 133 which coacts with a slidable rack 184 which is connected with the reciprocating table member 84 in such a manner that the rack is carried in feeding direction by the backward movement of the table. The arm 130 is rotatably mounted upon the shaft 181 and has at its pivoted end a brake drum 134 surrounded by a brake band 135, which brake band is connected to an upwardly projecting pin 186 attached to the supporting bracket. Pivotally attached at its end to the top of the pin 181, by means of an extension 142 and overlying the arm 130 and parallel therewith, is a rod 136 having at its end an L-shaped gripping finger 131 pivoted at 137 to the arm 130. Near its inner end the arm 130 is provided with a downwardly extending pin 138, to which is attached the outer end of a coiled spring 139. The inner end of this spring is fixed by means of a screw or the like to the fixed bearing 140 forming part of the bracket which supports the arm. An upwardly projecting lug or stop 141 is provided on the brake drum 134 to limit the movement of the rod 136 with the extension 142 about the shaft 181 or in the bearing 140. The rack 184 is slidably mounted upon a longitudinally extending bearing 143 and has a link 144 pivoted thereto at 145, which link extends underneath the table and has a notch 146 therein adapted to coact with a bracket 147 extending downwardly from the movable portion 84 of the table. The outer end of the link 144 is beveled as shown at 148 in Figure 16, and this outer end is adapted to contact with a roller 149 at the end of the return movement of the table which acts to lift the end of the link 144 and raise the notch 146 out of connection with the bracket 147 thereby stopping the feeding movement of the arm 130. The roller 149 is mounted upon the end of a pivoted link 150, the position of which may be adjusted by means of an adjusting nut or screw 151. A coiled spring 152 (see Figure 2) is provided to hold the link 144 in normal operative position. Projections 153 and 154 are provided to limit the movement of the arm 130 (see Figures 5 and 14) and a projection 155 is provided on the end of the bell-crank lever arm 81 adapted to co-operate with a portion of the bracket at 156 in order to limit the movement of the blank feeding portion 84 of the table toward the cup forming dies.

The operation is as follows:

A belt driven from any convenient source of power is shifted into position from the idling pulley 6 onto the driving pulley 5 by any convenient means whereupon the gear 7 upon the shaft 4 rotates the gear 8. The gear 14 upon the shaft 4 is thereby also rotated and it in turn drives the gear 15, which imparts action to the shaft 16 and the cup forming cone 18 thereon, the speed ratio between the gears 15 and 8 being 6:1. A similar and equal revolution is imparted to the forming cone 26 by means of the gears 27 and 28 mounted upon the shafts 25 and 16 respectively. The gears 27 and 28 have teeth of such a length that they are always in mesh even when the cones are slightly separated by the action of the raised portion of the cam 21. The high portion of this cam 21 upon which the roller 22 operates is so designed that the cup forming cones are separated for two and one-quarter revolutions and are in contact for three and three-quarters, which six revolutions complete the forming of a cup. The cup forming cones 18 and 26 are normally held in contact with each other by means of the helical spring 32 on the yoke 30 and are separable because the shaft 25 upon which the upper cup forming cone 26 is mounted rotates in the sleeve bearing 23 which is pivoted at 24 to the head 2 of the machine. While the cones are turning a reciprocating motion is given to the portion 84 of the table 83 by means of the bell crank 79—81 together with the link 78 mounted upon the gear 8. A blank of a suitable size and shape having been placed into the depression 87 of the table with its forward portion supported by the movable slide 88, the table is moved forward by the action of the bell crank lever 79—81 thereby pushing the blank into position between the dies. Upon such forward motion of the table the projection 86ª extending from the bottom of the slide 88 contacts with the corresponding projection 156 on the table supporting bracket and stops the forward motion of this slide before it comes into contact with the cones; while the remaining slidable portion 84 of the table continues to move forward so as to effect a positive feed of the blank into the cones. Upon rearward motion of the slide 84 the helical spring 86 comes into action and again projects the auxiliary slide 88 forward into its normal blank supporting position as shown in Figure 14.

The gear 109, which is in mesh with the main driving gear 8 is, by means of the beveled gears 105 and 107, driving the rollers 103 and 104 which feed the strip 102 forward to the cutting blades 110 and 111. These blades operate only intermittently, being actuated by means of the lever 113, which is periodically tripped through the medium of the trip lever 114, the free end of which is in the path of the roller 73 on the gear 8. A steady continuous feed of the strip 102 to the cutting blades would result in the buckling of the strip when the cutters are actuated. This is obviated by means of the brake 124 acting in combination with the lost motion clutch 121, 122 through which the gear 105 drives the feed rollers. When the arm 112 moves to operate the cutter blade 110, it contacts with the pivoted lever 125 which in turn actuates the brake band 124 tightening it on the drum 118 resulting in the momentary stopping of same and its integral gear 119; this lost motion being taken up by the spring 122. As soon as the cutter blade 110 moves upwardly again, the brake 124 is released and the spring 122 expands, thereby permitting the pin 121 to move into driving position against the forward face of the opening 123, which results in a uniform feed of a new portion of the strip 102 out between the cutters.

When the cup is fed into the dies they are at that moment separated—the drive of the table being so combined with the drive of the forming dies that the cam 21 is at just about the last portion of its high part which holds the cones separated. This position of the roller 73 on the gear wheel 8 is shown approximately by the numeral 158 in Figure 15, in which position the link 78 pivoted at 77 to the gear wheel 8 is at its extreme position and has brought the table 83 into close proximity with the cup forming dies. At the point 159 the table starts back and while the table is moving backward the end of the arm 130 holding a reinforcing tip is brought down through a circular path from the paper cutting knives to the cup forming dies, this being accomplished by the upward motion of the rack 184 which is actuated through the link 144 and its connection with the table 84 on account of the notch 146 having dropped onto the bracket 147 beneath the table and being carried backward thereby. The rack 184 acting through the gear 133 and pin 181 moves the rod 136 thereby, first actuating the gripper finger 131 and causing them to come together to grip the reinforcing tip held by the retainers 128 in delivery position. The feed of the tip is accomplished by means of the motion imparted to the arm 130 on account of the rod 136 having its end swung about by the pin or shaft 181, by means of its pivotal connection on the end of the arm 142. The rod 136 is moved by means of the arm 142 until the gripper fingers 131 come together, then any further motion of this rod with relation to the arm 130 being impossible, the arm 130 is then carried downward along with the rod 136 until the end of its stroke has been reached. The spring 139 being now compressed, comes into action upon the lifting out of the notch 146 from the bracket 147 by the contact of the beveled end 148 of the link 144 with the roller 149 on the end of the bracket or link 150, which is accomplished when the roller 73 is at the point 160 shown in Fig. 15. At the point 161 when the table has started upon its feeding stroke again the tip feeding arm 130 is moving upwards under the stress of the spring 139, which tends to bring it back into its normal upward position; however, to counteract any violent stop and consequent jarring of the arm at the end of its stroke, the brake 135 is provided which is adjusted to allow the arm to return to its normal position but retards its motion to such an extent that the end of the stroke is reached in a very gradual manner and the arm is gently stopped by means of the projection 153 which comes into contact therewith at its tip receiving position.

Between the positions 162 and 163, shown on Figure 15, the roller 73 is in contact with the release lever 72 for the air valve 69 which allows a current of air to be blown through the passage 66 in the shaft 16 and the cup forming cone 18 and which escapes through the apertures 65 in the end of the cone thereby blowing off the cup from the cone, the gripper finger 42 having been released and the upper cone 26 carried away from contact with the cone 18 by means of the raised portion of the cam 21 coming around into contact with the roller 22. At the point 164 shown in Figure 15 the roller 73 contacts with the trip lever 114, which actuates the cutting knife 110 upon the reinforcing tip cutting mechanism and severs another portion of the tape 102 allowing same to be held in position underneath the grippers 128 ready to be delivered to the next cup by means of the arm 130.

In order to permit the free operation of the gripping finger 42, which holds the blank in position on the cup forming cone 18 at the beginning of the operation a depression is made in the periphery of the upper cone 26 to allow the entrance of the gripper finger 42 thereinto upon the revolution of the cones. After the blank has been taken from the table 83 and is held in position upon the cup forming cone 18 by means of the gripper finger 42 and the auxiliary cone 26, the cones are given three and three-quarters revolutions while in contact with each other and sufficient heat is imparted to the upper cone by means of the gas jet 74 to melt the paraffin upon the edges of the blank and thereby form a cup which is sealed and non-leakable. The reinforcing tip is applied to the finished cup at almost the end of the third revolution and is then pressed into contact with the tip of the cup and is brought into such a position thereon that the longest diameter of the tip will overlap and come directly over the overlapping portion of the tip end of the blank after the same has been formed into a cup, thereby forming a cup which is sealed and non-leakable, and is reinforced particularly well at the tip thereof, which of course is subject to the greatest strain.

After three and three-quarters revolutions of the cones the raised portion of the cam 21 comes into contact with the roller 22 which acts to separate them and release the gripper 42. As the cones are separated the roller 73 contacts with the lever 72 and allows a current of air to be blown through the shaft 16 and cone 18 thereby forcing off the completed cup and delivering it into the chute 90, from whence it is carried by gravity to the container 91. The cones then continue to rotate through two and a quarter more revolutions while separated, during which time the movable portion of the table 83 is moving backwards and is receiving another blank into the depression 87, which blank is properly positioned by the operator of the machine. The forward motion of the slide 83 again takes place and upon the completion of the sixth revolution of the dies the table is again in position to deliver another blank to the cup forming cones which are then again just coming into contact, the high portion of the cam 21 having been passed. In the meantime the reinforcing tip carrying arm 130 has moved up and the knife 110 has operated to sever another reinforcing tip from the tape 102 and this arm 130 has gripped the severed tip and is just beginning to move down in order to deliver the reinforcing tip to the completed cup at about the end of the third revolution. The scraping blade 62 is provided on the upper cone 26 in order to remove any excess paraffin therefrom which would materially interfere with the production of uniform cups if allowed to accumulate upon the roller 26 which it might do on account of its heated condition. The operation of the gripping finger 42 is so timed as to hold the blank in position upon the lower die while the cones are in contact with each other and to immediately release the cup when the cones are being lifted apart and as soon as the air pressure is applied. This is accomplished by means of the sliding collar 36, which is actuated forwardly upon upward movement of the bearing member 23 and acts to push the yoke 38 toward the cone 18, thereby swinging the gripper finger 42 about its pivot 44 and acting to release the cup from the die. The adjustability of the gear 14 upon the shaft 4 by means of the sleeve 10 and bolts 12 is provided in order to move the gear 15 and the corresponding part of the cone forming member in order to adjust the time of contact of the gripper finger 42 with the blank and also the time of ejection of the cup by means of the air valve.

After the cup has been formed and thrown off the cone 18 it drops through the chute 90 into the container 91 and it is obvious that if it were allowed to fall to the bottom of the container 91 that the next cups would pile up upon the same in a rather irregular order, and in order to pack the cups for delivery a rearrangement of the same in the container 91 would be necessary. This contingency is provided for by having the supporting member 92 of the container 91 moved downwardly a predetermined space after each cup has been delivered thereinto in order to keep the top cup as near to the top of the container as possible, the stroke of the pawl 97 being so adjusted as to move the supporting member 92 down the exact ditsance at each reciprocation of the table.

I am aware that numerous details of construction may be varied through a wide range without departing from the principles of this invention, and I therefore do not purpose limiting the patent granted otherwise than necessitated by the prior art.

I claim as my invention:

1. In a machine for forming reenforced paper cups from suitable blanks, a pair of dies adapted to receive the blanks between them, and mechanism for continuously rotating the dies to form the cups, in combination with automatic means for first forming and then delivering a reinforcing tip thereto.

2. In a cup forming machine, the combination of mechanisms for forming cups from suitably formed blanks, and automatic means for forming and then delivering reinforcing tips thereto.

3. In an automatic cup forming machine, means for delivering reinforcing tips to the cup formers, comprising a pivoted arm, and automatic gripping means on the end of said arm, said gripping means being adapted to grip a reinforcing tip at one end of the path of travel of the arm and to automatically release the same at the other end of said path of travel.

4. In an automatic cup forming machine, the combination of means for delivering a reinforcing tip to the cup formers, said means including automatically acting knives for severing a reinforcing tip from a prepared strip, and an arm adapted to carry said severed tip from its point of severance to its point of delivery.

5. In an automatic cup forming machine, the combination of means for forming cups and means for feeding blanks thereto, means actuated by the cup forming means to sever a predetermined length of reinforcing strip, and means actuated by the blank feeding means to carry said severed strip from its point of severance to its point of contact with the cup forming means.

6. In a machine for forming reenforced cups from suitable blanks, a means for feeding reinforcing tips to the cup formers, said means including a pivoted arm, and a gripper finger on the end of said arm, said gripper finger being actuated by a rod connected to a shaft about which the arm rotates, said rod and gripper finger acting to move the feeding arm into feeding position, and a spring and brake means provided to return said arm to normal tip receiving position.

7. A feeding mechanism including an arm pivoted about a shaft, an auxiliary arm mounted on the end of said shaft, and a lever pivoted to the end of said auxiliary arm, said lever operating to actuate gripping means mounted on the end of the arm, and a brake and spring means adapted to return said feed arm to normal position after a feeding operation.

8. A machine for automatically forming reenforced cups comprising a set of cup forming dies, a blank feeding table, means adapted to release a completed cup, cutting means for severing and shaping reinforcing tips for the cups, means for delivering said reinforcing tips from the cutting means to the cup forming dies, said means being all operated by a master gear.

9. In a machine for manufacturing reenforced paper cups, mechanisms for forming the cups from prepared blanks, and means for supplying a reinforcing tip to each cup, said means including a knife adapted to cut a reinforcing tip from a strip of prepared paper, and provided with a lost motion clutch so as to prevent the possibility of buckling of the paper while being cut by the knife.

10. In an automatic cup forming machine, means for forming cups, and means for supplying reinforcing tips to the completed cups, said means including a cutter to separate the tips from a prepared strip, and feeding means acting automatically to grip the reinforcing tip, transfer same to the proximity of the forming dies and release the same at the moment when it is gripped by the dies.

11. In a machine for forming reenforced paper cups, means for forming the cups from prepared blanks and means for delivering a reinforcing tip to each formed cup, said means including a roll for holding a strip of prepared paper, a cutter, feeding means for feeding the strip of prepared paper to the cutter, said feeding means including a pair of rollers driven by a gear wheel, the driving gear wheel being actuated by means of a driven gear attached to the same through the medium of a spring clutch whereby at each cutting operation a predetermined amount of lost motion is taken up by the spring clutch, the action of said clutch being determined by a brake means actuated at the same moment as the cutting means.

12. A machine for automatically forming reenforced paper cups, said machine including a pair of forming dies, a feed table adapted to intermittently feed prepared blanks to the forming dies, a cutting means adapted to separate prepared reinforcing tips from a strip of paper, feeding means adapted to deliver a prepared tip to the dies at the completion of a formed cup, said cutting means being actuated by a trip mechanism operated by the main driving gear, and said tip feeding means being actuated by the motion of the feed table.

13. In an automatic cup forming machine, means for forming reenforced paper cups including dies by which the cups are formed, a reciprocating table for feeding prepared blanks to the dies, a cutting mechanism for separating reinforcing tips from a prepared strip, holding means for receiving the separated tips in delivery position, and feeding means adapted to automatically grip and transfer the reinforcing tips from the holding means to the cup forming means.

14. In a machine for automatically forming reenforced paper cups, dies upon which the cups are formed, means for feeding prepared blanks to the dies, means for separating reinforcing tips from a prepared strip, and means adapted to transfer the reinforcing tips from the cutting means to the cup forming dies, said transfer means being actuated by a rack driven synchronously with the blank feeding means.

15. In a machine for automatically forming reenforced paper cups, dies upon which the cups are formed, means for feeding prepared blanks to the dies, means for separating reinforcing tips from a prepared strip, and means adapted to transfer the reinforcing tips from the cutting means to the cup forming dies, said transfer means being actuated by a rack driven synchronously with the blank feeding means and operated by the reciprocation of the same.

16. In a machine for automatically forming reenforced paper cups, dies upon which the cups are formed, means for feeding prepared blanks to the dies, means for separating reinforcing tips from a prepared strip, and means adapted to transfer the reinforcing tips from the cutting means to the cup forming dies, said transfer means being actuated into feeding position by the receding motion of the blank feeding means and automatically returned to tip gripping position.

17. In a machine for automatically forming reenforced paper cups, dies upon which the cups are formed, means for feeding prepared blanks to the dies, means for separating reinforcing tips from a prepared strip, and means adapted to transfer the reinforcing tips from the cutting means to the cup forming dies, said transfer means being moved to its original position by means of a spring and brake, said spring and brake being allowed to act upon the automatic release of an actuating arm extending underneath the blank feeding table and contacting with a releasing roller at predetermined times.

18. In a machine for forming reenforced paper cups, the combination of cup forming means, a reciprocating table adapted to deliver prepared blanks to the cup forming means, cutting means adapted to separate reinforcing tips from a prepared strip, feeding means adapted to deliver said reinforcing tips from the cutting means to the cup forming means, said feeding means being actuated by a rack and gear, said rack being movable and actuated in one direction by a movement of the blank feeding table away from the dies, and said feeding means being actuated in the other direction by means of a coiled spring, the action of which is controlled by an adjustable brake, said spring and brake being allowed to act upon the interruption of the feeding movement of the feed means which occurs when the lever actuating the movable rack is tripped from its operative position by means of a roller in the path of the beveled end of said lever.

19. In a machine for forming receptacles from suitably formed blanks, a pair of rollers comprising a forming roller and a pressing roller adapted to co-operate to wrap a blank upon the forming roller, and means for rotating said rollers, in combination with means for forming and inserting a reinforcing piece or tip between said rollers at a predetermined point in the receptacle forming operation.

20. In a machine for forming receptacles from suitably formed blanks, a pair of rollers comprising a forming roller and a pressing roller adapted to co-operate to wrap a blank upon the forming roller, means for rotating said rollers, a holder for a prepared strip from which reinforcing tips are made, means for making said tips, and means for removing a prepared tip from the forming means and delivering it to said rollers at a predetermined point in the forming operation.

21. In a machine for forming receptacles from suitably formed blanks, a pair of rollers comprising a forming roller and a pressing roller adapted to co-operate to wrap a blank upon the forming roller, means for operating said rollers, a holder containing a strip from which reinforcing pieces for the receptacles are cut, and mechanism for automatically removing said pieces from the cutting means and presenting same to the rollers at a predetermined point in the cup forming operation.

22. In a machine for forming reenforced receptacles, a holder containing a strip from which the reinforcing members are made, means for forming said members, and means for transferring same from the forming means to the receptacle forming dies at a predetermined point in the forming operation.

23. In an automatic cup forming machine, the combination of means for delivering reinforcing tips to the cup formers, said means including automatically acting formers for the reinforcing tip, and a delivery means adapted to deliver said tip after being formed to the cup forming mechanism.

24. In a machine for forming reenforced paper cups from suitably formed blanks, means for feeding reinforcing tips to the cup formers, said means including a pivoted arm and a gripper finger on the end of said arm, said gripper finger being actuated by a rod connected to a shaft about which the arm rotates, the rod and gripper finger acting to move the feeding arm into feeding position.

25. In a cup forming machine, the combination of mechanism for forming cups, and automatic mechanisms for cutting, holding, and then delivering reinforcing tips to the completed cups.

26. In a cup forming machine the combination of mechanisms for forming cups, automatic means for delivering reinforcing tips to the completed cups, and means for rendering the cup blanks adhesive.

27. A machine for forming reenforced receptacles from blanks including a feeding means, a continuously operated forming means, a mechanism operated by the feeding means for delivering reinforcing blanks to said forming means, and a discharging means for the receptacles.

28. A machine for forming reenforced receptacles from blanks including a feeding means for the blanks, a forming means therefor, a forming and feeding means for the reinforcing members, and a discharging means for the receptacles.

29. A machine for forming reenforced receptacles from blanks including a feeding means for the blanks, a forming means therefor, a forming and feeding means for the reinforcing members, and a discharging means for the receptacles, said receptacle forming means including a pair of continuously operated dies.

30. A machine for forming reenforced receptacles from suitable blanks including a continuously operated forming means and an intermittently operated feeding and forming means for the reinforcing members.

31. In a machine for forming reenforced receptacle, the combination of blank feeding and forming means, reinforcing tip forming and feeding means, receptacle discharging means, and automatic stacking means all operated by a master gear.

32. In a machine for forming reenforced receptacles from prepared blanks, the combination of feeding means and forming means for the blanks, forming means and feeding means for the reinforcing means and means coacting with said first named means to render the prepared blanks and reinforcing members adhesive.

33. In a cup forming machine the combination with mechanisms for forming cups from blanks, of means for automatically cutting reinforcing tips, and mechanisms for automatically gripping the reinforcing tips and delivering the same to said forming mechanisms.

34. In an automatic cup forming machine, the combination with a material feed mechanism, of means for automatically cutting reinforcing blanks therefrom, a mechanism for holding said reinforcing blanks, and means for automatically removing said reinforcing blanks from said holding mechanism.

35. In a cup forming machine, the combination with cup forming mechanisms, of a material feed device, means for automatically cutting cup reinforcing blanks from the material, a mechanism for holding said reinforcing blanks, and means for automatically removing said reinforcing blanks from said holding mechanism and then delivering the same to said cup forming mechanisms.

36. In a cup forming machine, the combination with mechanisms for forming cups from blanks, of rack operated means for delivering reinforcing blanks to said cup forming mechanisms.

37. In a cup forming machine, the combination with mechanisms for forming cups from blanks, means for heating said mechanisms to render the cups adhesive, means for automatically delivering reinforcing tips to the adhesive cups, and means for ejecting the reenforced cups.

38. A machine for forming reenforced receptacles from blanks including a feeding means for blanks, forming dies for the blanks, a heating means associated with one of said dies, a forming and feeding means for reinforcing members, and a receptacle discharge mechanism associated with the other of said dies.

39. A machine for forming reenforced receptacles from suitable blanks including continuously operated forming mechanisms, means for feeding blanks thereto, and a forming and feeding means for reinforcing members operated by said blank feeding means.

40. In a cup forming machine, the combination with a feeding means for blanks, a forming means for said blanks, a tip forming mechanism, means operated by the blank feeding means for delivering the tips to the forming means to reinforce the cups, means for automatically ejecting the reenforced cups from said forming means, and mechanisms for automatically stacking the ejected cups.

41. A machine for forming reenforced paper cups, said machine comprising a pair of forming dies, a feed table for blanks, means for operating the same, a mechanism for feeding a strip of paper, cutters connected therewith for cutting reinforcing tips from said strip of paper, a holder for the reinforcing tips, a mechanism operable by the feed table for removing the tips from said holder and delivering the same to said forming dies, means connected with the forming dies for rendering the blanks and tips adhesive, means for automatically separating the forming dies at a predetermined time, means for holding the blanks on the forming dies, a device for automatically releasing the holding means when the forming dies are separated, a mechanism for automatically ejecting the reenforced cups, and means for receiving and stacking the ejected cups.

42. The combination with a machine for forming reenforced cups from blanks, of means for automatically cutting reinforcing tips, and means for automatically delivering the tips into the machine.

43. In an automatic cup forming machine, the combination with a material feed mechanism, of means for cutting reinforcing blanks therefrom, and resilient members for holding the reinforcing blanks.

44. In an automatic cup forming machine, the combination with a material feed mechanism, of means for cutting blanks therefrom, resilient members for holding the cut blanks, and means for pulling said blanks from beneath said resilient members.

45. In a cup forming machine, the combination with mechanisms for forming cups from blanks, means for heating said mechanisms to render the cups adhesive, and means for delivering reinforcing tips to the adhesive cups.

46. In a cup forming machine, the combination with a reciprocating blank feed table, of mechanisms for forming cups from blanks, and rack operated means operable by the feed table, for delivering reinforcing tips to said cup forming mechanisms.

47. In a cup forming machine, the combination with mechanisms for forming cups from blanks, of gripping means for delivering reinforcing blanks to said cup forming mechanisms, and a rack operated from the machine for actuating said gripping means.

48. In a cup forming machine, the combination with mechanisms for forming cups from blanks, of gripping means for delivering reinforcing blanks to said cup forming mechanisms, and reciprocating means for operating said gripping means.

49. In a cup forming machine the combination with cup forming members, of a reciprocating table for feeding cup blanks to said forming members to be formed into cups, and means operated by said reciprocating table for delivering reinforcing blanks to said cup forming members.

50. In a cup forming machine the combination with cup forming members, of a feed table adapted when operated to cause cup blanks and cup reinforcing blanks to be fed to said forming members.

51. A machine for forming reenforced paper cups, said machine comprising forming means, mechanisms operable from the machine for feeding cup blanks and cup reinforcing tips to said forming means to be formed into reenforced cups, and a cup stacking attachment connected to be operated by the machine for automatically stacking the formed reenforced cups.

52. In a cup forming machine, cup forming means, a reciprocating table for feeding cup blanks to the forming means, means operated by the machine for feeding cup reinforcing material into the machine, a cutter mechanism operable by the machine for cutting reinforcing tips from said material, a pin journalled on the machine, a gripper mechanism on said pin, a gear also mounted on said pin, and a rack connected to be operated by said reciprocating table for actuating said gears to cause the gripper mechanism to grip the reinforcing tips and deliver the same to said forming means.

53. The combination with a cup forming machine and the forming members thereof, of a movable table for feeding cup blanks to said forming means to be formed into cups, a rack operated by said table, a gear actuated by said rack, a spring controlled arm adapted to be actuated by said gear, gripping means thereon adapted to engage reinforcing tips and feed the same to said forming members, and a brake mechanism connected with said spring controlled arm to eliminate shocks due to the action of said spring in returning the arm back into normal position.

54. The combination with a machine for forming reenforced paper cups, of automatic means operated by the machine for first cutting and then delivering reinforcing tips to be applied to partially formed cups.

55. In a cup forming machine the combination with cup formers, of a plurality of blank feed mechanisms operated from the machine for first automatically feeding cup body blanks and then reinforcing blanks to said formers.

56. In an automatic cup forming machine, the combination with means for forming cups, of means for feeding blanks thereto, and means actuated by the cup forming means to cut predetermined lengths of a reinforcing strip to afford reinforcing tips for the cups.

57. The combination with a cup forming machine, of mechanisms for automatically feeding cup blanks and reinforcing tips into the machine, and means for rendering the cup blanks and said tips adhesive.

58. The combination with a cup forming machine, of intermittently operated cutters, a feed mechanism operated from the machine for continuously feeding a material to said cutters to be cut into blanks, and a lost motion device associated with said feed mechanism to obviate buckling of said material between the feed mechanism and said cutters.

59. The combination with a cup forming machine, of intermittently operated cutters operated from the machine, material feed rollers on the machine, means driven from the machine for operating said feed rollers to cause the material to be continuously fed to said cutters to be cut into cup reinforcing blanks, and a lost motion device between said feed rollers and said driven means to obviate buckling of said material between said feed rollers and said cutters.

60. The combination with a cup forming machine, of a blank feed mechanism operated thereby, and a reinforcing tip feed mechanism operated by said blank feed mechanism.

61. The combination with a cup forming machine, of a blank feed table operated thereby, a reinforcing tip feed mechanism, a bracket on said blank feed table, a member for actuating said reinforcing tip feed mechanism, a spring controlled link pivoted to said member and having a notch therein to engage said bracket to permit the blank feed table to operate said member, and means for releasing said link from said bracket.

62. The combination with a cup forming machine and the cup forming means thereof, of a blank feed table operated by the machine, a bracket on said table, a reinforcing tip feed device, a reciprocating member for operating the same to cause the tip feed device to swing through an arc of a circle to deliver a tip to the cup forming means, a notched member pivoted to said reciprocating member and adapted to engage with said bracket to permit the table to operate the reciprocating member, a device for releasing said notched member after a tip feeding operation, and means for returning said tip feed device to normal position when said notched member is released.

63. The combination with a cup forming machine and the cup forming means thereof, of a reciprocating table for feeding blanks to said cup forming means, a tip feed mechanism adapted to be operated by said table to feed tips to said cup forming means, resilient means for returning said tip feed mechanism to normal position after a tip feeding operation, and a brake mechanism to obviate shocks to said tip feeding mechanism when returned to normal position by said resilient means.

64. The combination with a cup forming machine, of a tip feeding mechanism adapted to feed tips into the machine, of means for returning said tip feed mechanism to normal position after a feeding operation, and a brake device co-acting with the tip feed mechanism to obviate shocks thereto when the tip feeding mechanism is returned to normal position.

65. The combination with a cup forming machine, of a plurality of mechanisms for automatically feeding cup blanks and reinforcing tips into the machine, and brake mechanisms associated with the reinforcing tip feeding mechanisms adapted to obviate shocks thereto when said reinforcing tip feeding mechanisms are returned to normal position after a feeding operation.

66. The combination with a cup forming machine, of a blank feed mechanism operated thereby, a reinforcing tip feed mechanism operated by said blank feed mechanism, and a brake mechanism co-acting with said reinforcing tip feed mechanism to obviate shocks thereto.

In testimony whereof I have hereunto subscribed my name in the presence of two subscribing witnesses.

PETER T. POTTS.

Witnesses:
 FRANK C. SMITH,
 HORACE A. GRIGNOW.